US006892259B2

(12) United States Patent
Goodrum et al.

(10) Patent No.: US 6,892,259 B2
(45) Date of Patent: May 10, 2005

(54) METHOD AND APPARATUS FOR ALLOCATING COMPUTER BUS DEVICE RESOURCES TO A PRIORITY REQUESTER AND RETRYING REQUESTS FROM NON-PRIORITY REQUESTERS

(75) Inventors: Alan L. Goodrum, Tomball, TX (US); Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 509 days.

(21) Appl. No.: 09/967,608

(22) Filed: Sep. 29, 2001

(65) Prior Publication Data

US 2003/0065847 A1 Apr. 3, 2003

(51) Int. Cl.[7] .......................... G06F 12/00; G06F 13/14; G06F 13/38
(52) U.S. Cl. ...................... 710/244; 710/107; 710/241; 710/39; 710/309; 710/310; 710/41; 710/113
(58) Field of Search ................................ 710/107, 113, 710/305–306, 309–310, 100, 240–244, 36–45, 56

(56) References Cited

U.S. PATENT DOCUMENTS

| | | | | |
|---|---|---|---|---|
| 6,421,756 B1 | * | 7/2002 | Kelley et al. | 710/310 |
| 6,457,077 B1 | * | 9/2002 | Kelley et al. | 710/56 |
| 6,477,610 B1 | * | 11/2002 | Willenborg | 710/310 |
| 6,581,141 B1 | * | 6/2003 | Kelley et al. | 711/154 |
| 6,694,397 B2 | * | 2/2004 | Lackey et al. | 710/112 |
| 2002/0078282 A1 | * | 6/2002 | Drerup et al. | 710/107 |
| 2002/0120799 A1 | * | 8/2002 | Shah | 710/241 |
| 2002/0144039 A1 | * | 10/2002 | Lackey et al. | 710/240 |
| 2003/0037198 A1 | * | 2/2003 | Hunsaker | 710/313 |
| 2003/0046473 A1 | * | 3/2003 | Dobson et al. | 710/306 |

OTHER PUBLICATIONS

"Method to Improve Performance of Split–Read Transactions," Oct. 1, 2000, IBM Technical Disclosure Bulletin, UK, Issue 438, 1871.*
Prakash, K., "An Attempt to Completely Utilize the Bandwidth Capability of PCI–X 133MHz Devices in a 66MHz PCI–X Local Bus," May 14–17, 2000, IEEE, The 4th Int'l Conference/Exhibition on High Performance Computing in the Aisa–Pacific Region, 106–109.*
Cases, M., "Design, Modeling and Simulation Methodology for PCI–X Subsystems," Oct. 23–25, 2000, IEEE Conference on Electrical Performance of Electronic Packaging, p. 33–36.*

* cited by examiner

Primary Examiner—Mark H. Rinehart
Assistant Examiner—Donna K. Mason

(57) ABSTRACT

A target device in a computer bus system allocates resources by selecting a priority requester for allocation of scarce resources. In a non-bus arbiter configuration, the first initiator device to receive a retry response to a transaction request after the resources are exhausted is designated as a priority requester. In a bus arbiter configuration, the priority requester is chosen on a round-robin basis from initiator devices that received a retry response to the initiator's most recent transaction request. If only one resource is available when an initiator sends a transaction request, the initiator receives a retry response unless the initiator is the priority requester.

26 Claims, 10 Drawing Sheets

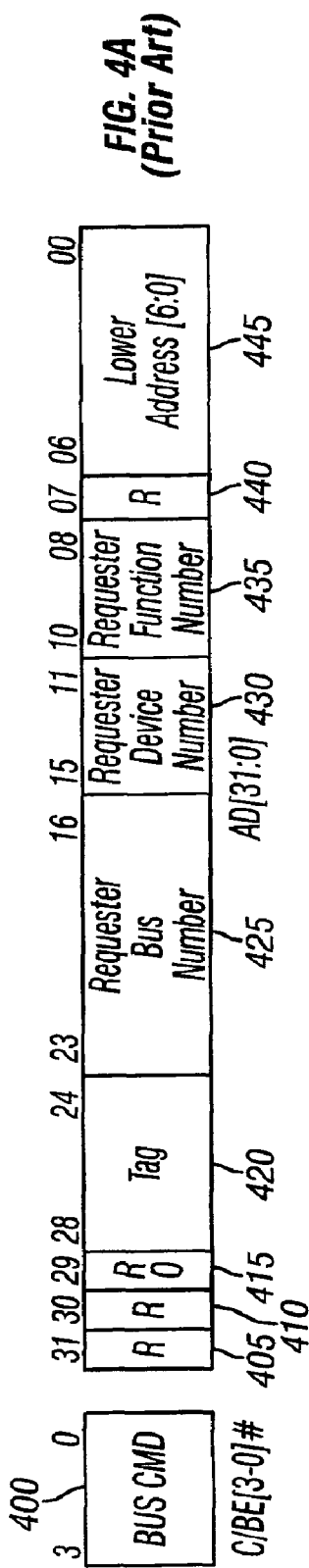
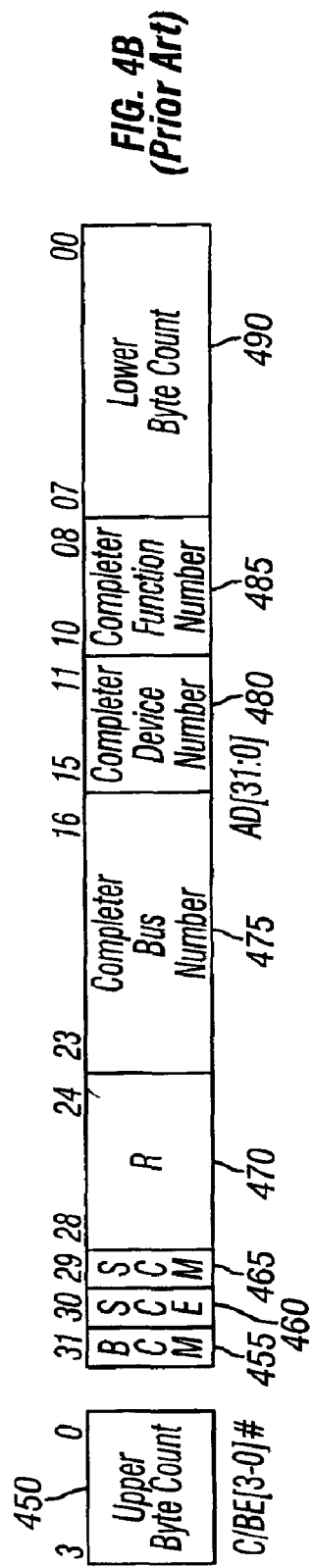
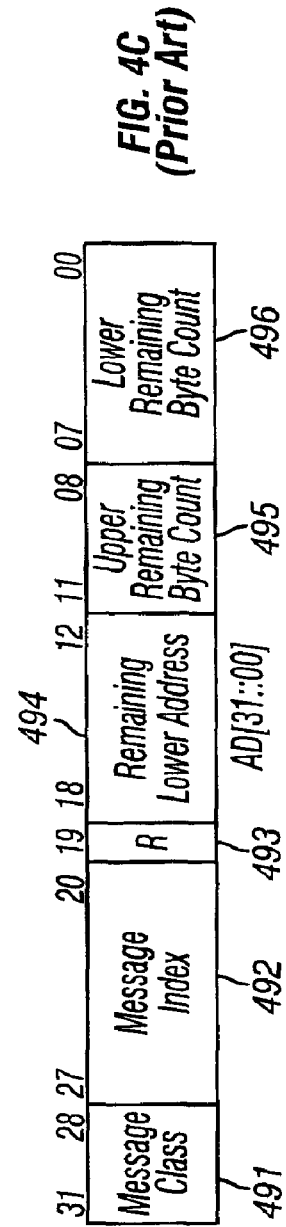

METHOD AND APPARATUS FOR ALLOCATING COMPUTER BUS DEVICE RESOURCES TO A PRIORITY REQUESTER AND RETRYING REQUESTS FROM NON-PRIORITY REQUESTERS

CROSS-REFERENCE TO RELATED APPLICATIONS

This application is related to commonly owned U.S. Pat. No. 6,266,731, entitled "HIGH SPEED INTERCONNECT APPARATUS, METHOD AND SYSTEM," by Dwight Riley and Christopher J. Pettey, which is hereby incorporated in its entirety by reference for all purposes.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to a technique for allocating resources in a computer system and particularly to allocating computer bus device resources to a priority requester and retrying requests from non-priority requesters.

2. Description of the Related Art

Business-critical applications continue to demand greater bandwidth and shorter response times from the input/output (I/O) subsystems of computers. As faster and more complex I/O devices, such as Gigabit Ethernet, Fibre Channel, Ultra3 SCSI, and multi-port network interface controllers (NICs) appear on the market, conventional PCI bus technology operating at 33 MHz frequently becomes a performance bottleneck.

At the same time, the computing model is demanding more scalability, availability, and reliability as the enterprise becomes more distributed. To fulfill these needs, high-bandwidth architectures such as system area networks are emerging. System area networks are used to connect distributed resources such as clustered servers, I/O, and storage. Using the PCI bus as a backbone interconnect for these high-bandwidth system architectures can stretch the PCI bus to its limit.

Optimal system performance requires a balance between the processor-to-memory subsystem and the I/O subsystem. Since the introduction of the PCI bus in 1992, the internal clock frequencies of processors have increased dramatically, from less than 100 MHz to more than 1 gigahertz (GHz). The processor-to-memory bus (front-side bus) is now 64 bits wide and operates in the range of 100 to 333 MHz for X86 and Alpha processors. Although the 64-bit, 66-MHz PCI extension exists, the PCI frequency remains at 33 MHz for the vast majority of systems and adapters.

To break this I/O bottleneck, both system and I/O adapter designers are migrating their designs to the 64-bit, 33-MHz PCI bus, which provides a peak bandwidth of 266 megabytes per second (MB/s). The PCI Local Bus Specification Revision 2.2, published by the PCI SIG, a copy of which is incorporated by reference, allows a 66-MHz PCI bus. However, the specification has many technical design challenges that have slowed its implementation. Even when system designers overcome these challenges, the 66-MHz PCI bus at its peak bandwidth of 533 MB/s is not adequate for long-term needs such as multi-port NICs with Gigabit Ethernet. For example, a four-port Gigabit Ethernet NIC, with each port capable of 1 gigabit per second, or 125 MB/s, would overwhelm the 64-bit, 66-MHz PCI bus bandwidth by using essentially all available bandwidth.

Several vendors, including Compaq Computer Corporation, Hewlett-Packard, Inc., and IBM Corp., collaborated to produce the PCI-X specification. PCI-X technology leverages the wide acceptance of the PCI bus and provides an evolutionary I/O upgrade to conventional PCI. PCI-X technology increases bus capacity to more than eight times the conventional PCI bus bandwidth—from 133 MB/s with the 32-bit, 33-MHz PCI bus to 1066 MB/s with the 64-bit, 133-MHz PCI-X bus. It enhances the PCI protocol to develop an industry-standard interconnect that exceeds a raw bandwidth of 1 gigabyte per second (GB/s) and will meet upcoming bandwidth needs of enterprise computing systems. PCI-X provides backward compatibility with the PCI bus at both the adapter and system level.

The conventional PCI protocol supports delayed transactions. With a delayed transaction, a device requesting data must poll a target to determine when the request has been completed and its data is available. The PCI-X protocol replaces delayed transactions with split transactions. With a split transaction as supported in PCI-X, the device requesting the data sends a request to the target. The target device informs the requester that it has accepted the request. The requester is free to process other information until the target device initiates a new transaction and sends the data to the requester. Thus, split transactions enable more efficient use of the bus. Devices such as host bridges that are routinely addressed by multiple other devices are encouraged to complete multiple split transactions concurrently.

If an application benefits from completing multiple transactions of one type concurrently but not others, the device might continue to accept and execute some non-posted transactions and terminate others with retry. For example, if a device is designed to complete multiple memory read DWORD transactions concurrently, but only a single configuration read transaction, the device would signal Split Response to the first memory read DWORD transaction and the first configuration read DWORD transaction. The device would signal Split Response to a subsequent memory read DWORD transaction that was received before the device executed the Split Completion for the first transaction. However, the device would signal retry if it received a subsequent configuration read before the device executed the Split Completion for the first one.

Resources on the target device are typically dedicated to split transactions to allow the target device to process multiple split transactions. Supporting multiple pending split transactions allows more efficient use of the bus and target resources. However, if multiple requesters or initiators attempt to perform transactions with the same target device simultaneously or close in time, some initiator devices can be starved, receiving retry responses to transaction requests if other initiator devices are allocated target device resources each time those resources become available.

BRIEF SUMMARY OF THE INVENTION

Briefly, a computer system employs a technique for allocating resources in a target device on a computer bus. The target device receives transaction requests from a plurality of initiator devices via the computer bus. If none of the resources of the target device are available, the initiator devices receive retry responses. If more than one resource is available when a transaction request is made, the initiator device is allocated the resource. If no resources are available, or if no requester is identified as a priority requester, the requesting initiator is identified as a priority requester device and a retry response is sent to the initiator device. If only one resource is available and a priority requester has been identified, only the priority requester initiator device will be allocated the resource. Other initiator devices will receive a retry response.

In one embodiment, identification of the priority requester device is achieved by storing identification information of the first initiator device to receive a retry response after all resources have been allocated. If only one resource is available, the stored identification information is compared to the identification information of the initiator device, allocating the resource if a match is found and sending a retry response if the stored identification information does not match.

In a further embodiment, the stored identification information is stored in a register of the target device.

In another embodiment, a plurality of identifiers is associated with the plurality of initiator devices. The target device sets the identifier associated with the initiator device if the transaction request is responded to with a retry request; otherwise, the target device resets the identifier. The primary requester is determined by selecting a first set identifier and identifying the associated initiator device as the primary requester device.

In a further embodiment, the first identifier is selected on a round-robin basis.

In another further embodiment, the target device is a bus arbiter and the identifiers are associated with the initiator devices by associating the identifiers with the GNT# signal of the initiator devices.

In one embodiment, the computer bus is a PCI-X bus and the resources are Split Completion resources.

In a further embodiment, the transaction request is a byte-count memory-read transaction. In another further embodiment, a Split Response message is sent to the initiator device as part of allocating the resource to the initiator device.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which:

FIG. 4a is a block diagram illustrating a conventional PCI-X Split Completion address;

FIG. 4b is a block diagram illustrating a conventional PCI-X completer attribute format;

FIG. 4c is a block diagram illustrating a conventional PCI-X Split Completion message format;

DETAILED DESCRIPTION OF THE INVENTION

Figure 1:
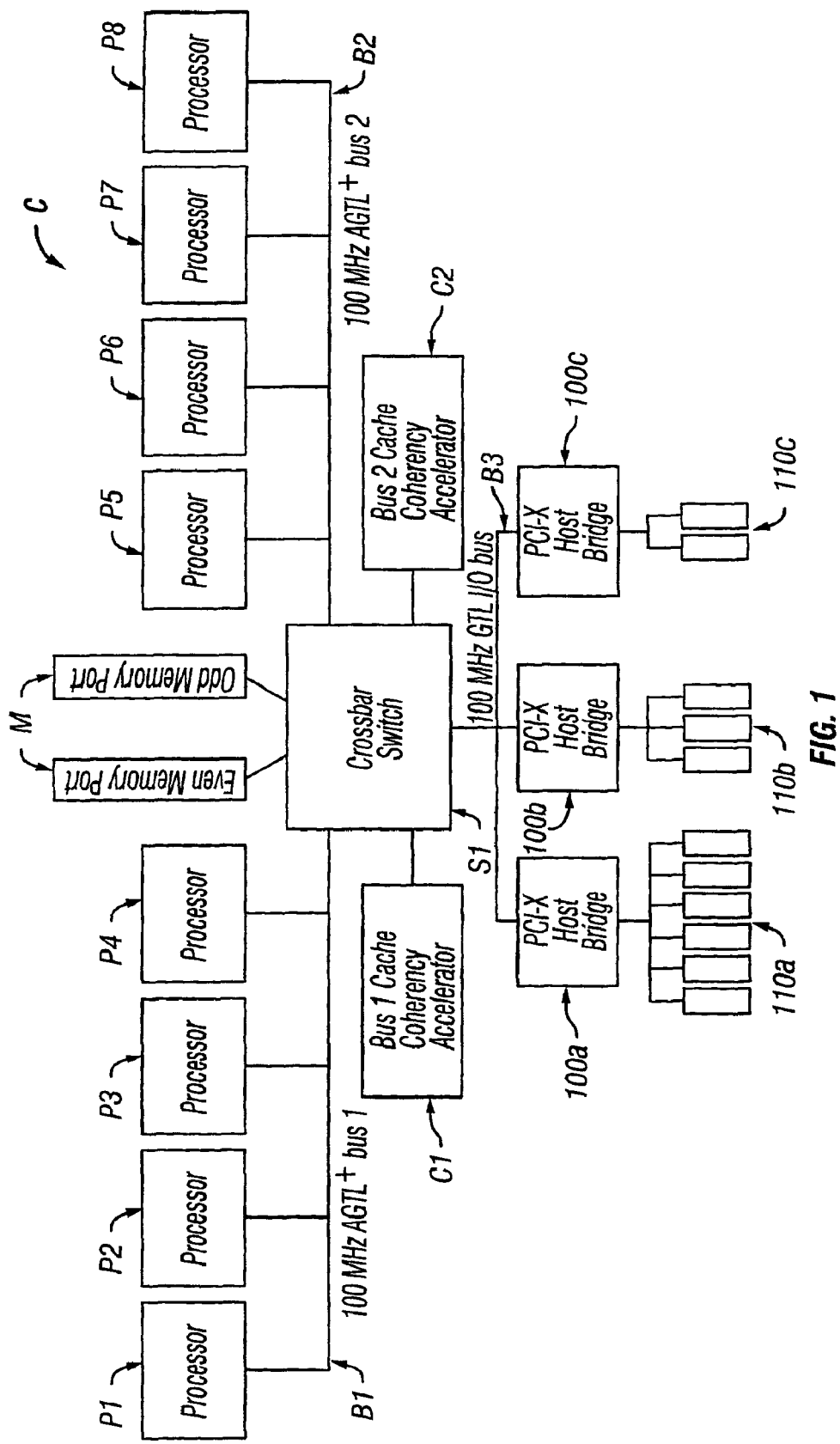
FIG. 1 is a block diagram illustrating a computer bus-connected system of one embodiment.

FIG. 1 is a block diagram of a computer system C of one disclosed embodiment. As shown in FIG. 1, eight processors P1–P8 are connected via busses B1 and B2 to crossbar switch S1. Also connected to chipset S1 are odd and even memory ports M, and bus cache coherency accelerators C1 and C2. An I/O bus B3 connects the crossbar switch S1 to three host bridges 100a–100c, to which groups of devices 110a–110c are attached. Any of the devices of groups 100a–110c can initiate split transactions. In one embodiment, each of the processors P1–P8 is an Intel Corporation XEON processor and the crossbar switch is an Intel Corporation PROFUSION chipset. In one embodiment, busses B1 and B2 are Advance Gunning Transceiver Logic (AGTL) 100 MHz busses, while I/O bus B3 is a 100 MHz Gunning Transceiver Logic (GTL) I/O bus. In one embodiment, host bridges 100a–100c are PCI-X host bridges and devices 110a–110c are PCI-X devices. Some of the devices 110a–110c provide support for multiple split transactions, as explained below, allocating resources in the device to such transaction. In a disclosed embodiment, those devices 110a–110c can issue retry responses when only a single resource is available and the transaction is requested by other than a priority requester, as explained below. In another disclosed embodiment, the host bridges 100a–100c include an arbiter and provide support for multiple split transactions, as explained below. Other processors, busses, crossbar switches, and host bridges can be used. Other devices 110a–110c that do not support split transactions can also be used. Further, different numbers of processors, busses, host bridges and devices can be used. Although the computer system C of FIG. 1 is a multiprocessor configuration, single processor systems can be used. In a single processor system, the crossbar switch can be omitted. Other techniques for coordinating multiple processors in a multiprocessor system can also be used.

Figure 2A:
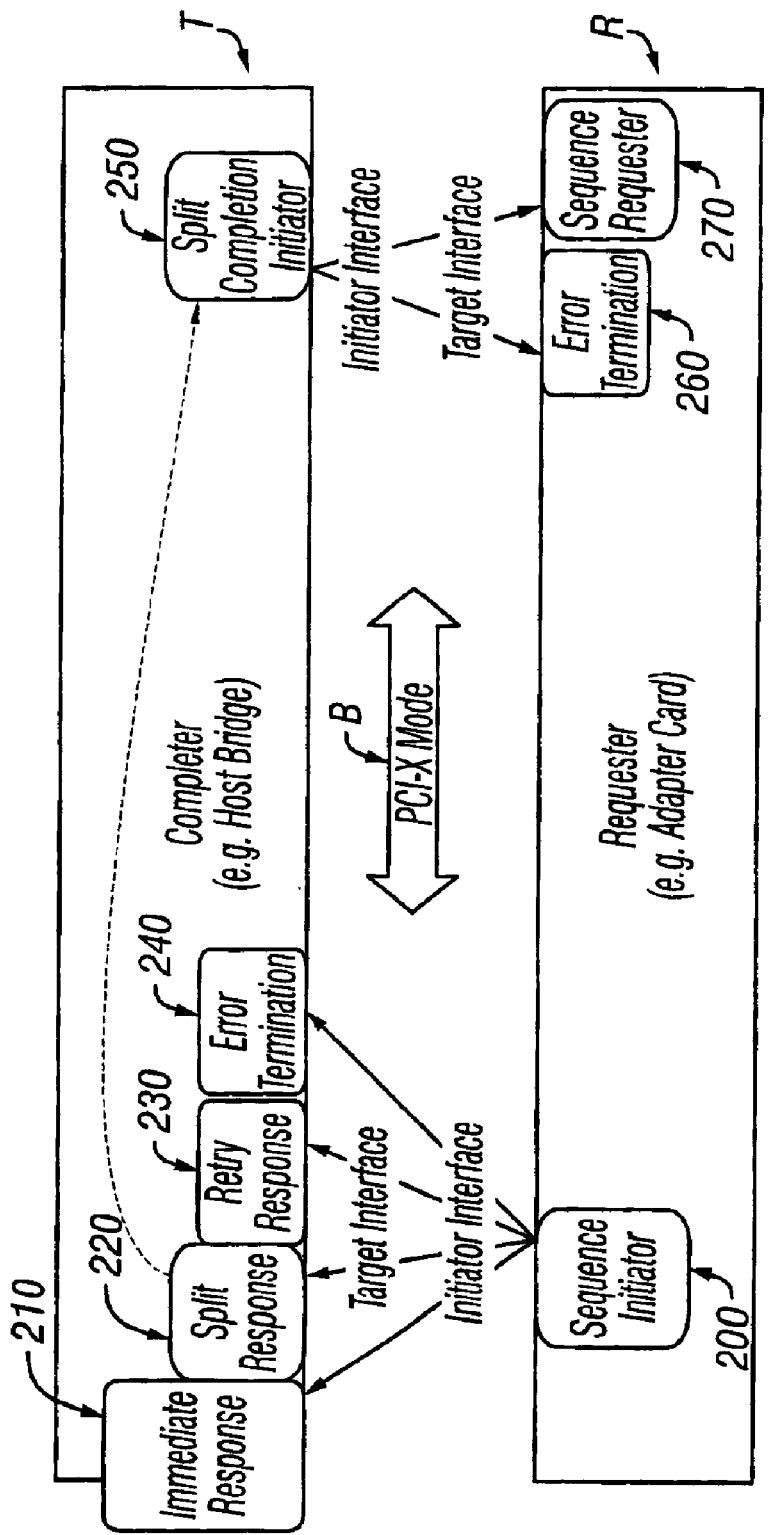
FIG. 2a is a block diagram illustrating a conventional PCI-X transaction sequence without crossing a bridge.

Turning to FIG. 2a, an overview of conventional PCI-X transactions is shown, including split transactions. In the following, the terms initiator and requester are used interchangeably. Likewise, the terms completer and target are used interchangeably. A requester R, such as an adapter card, initiates requests with a sequence initiator interface 200. A PCI-X transaction such as a memory read is sent across the PCI-X bus B to a target interface of a completer target device T. Other transaction types are similarly sent to the target T. If the target device T can respond immediately, an immediate response 210 is returned to the initiator R. If an error occurs, an error termination 240 is returned to the initiator R to end the PCI-X transaction. If the target T cannot respond immediately to the transaction request, either a Split Response 220 or a retry response 230 can be issued. A retry response 230 can be used to indicate that the target T does not have available resources necessary at the time of the request. Unlike a PCI retry response, there is no requirement for a PCI-X initiator receiving a retry response 230 to repeat the transaction request. Alternatively, if sufficient resources are available, a Split Response 220 can be returned to the initiator R. A Split Response 220 indicates that at some later time the target T will complete the request as a split transaction, with a Split Completion transaction 250. A Split Completion transaction 250 is a transaction initiated by the target T of the split transaction, using the requester R of the split transaction as the target of the Split Completion transaction 250. The Split Completion transaction 250 will return requested data, if any, to the requester R. In the interim, the requester R can perform other transactions. A target T can have resources for handling multiple split transactions.

When a target T has completed a split transaction, it issues a Split Completion transaction request 250 to the initiator R, which acts as a target for the Split Completion transaction 250. If the Split Completion transaction 250 indicates an error, then an Error Termination event 260 is processed by the initiator R; otherwise, the sequence requester interface 270 handles the Split Completion transaction 250 to complete the original split transaction.

Figure 2B:
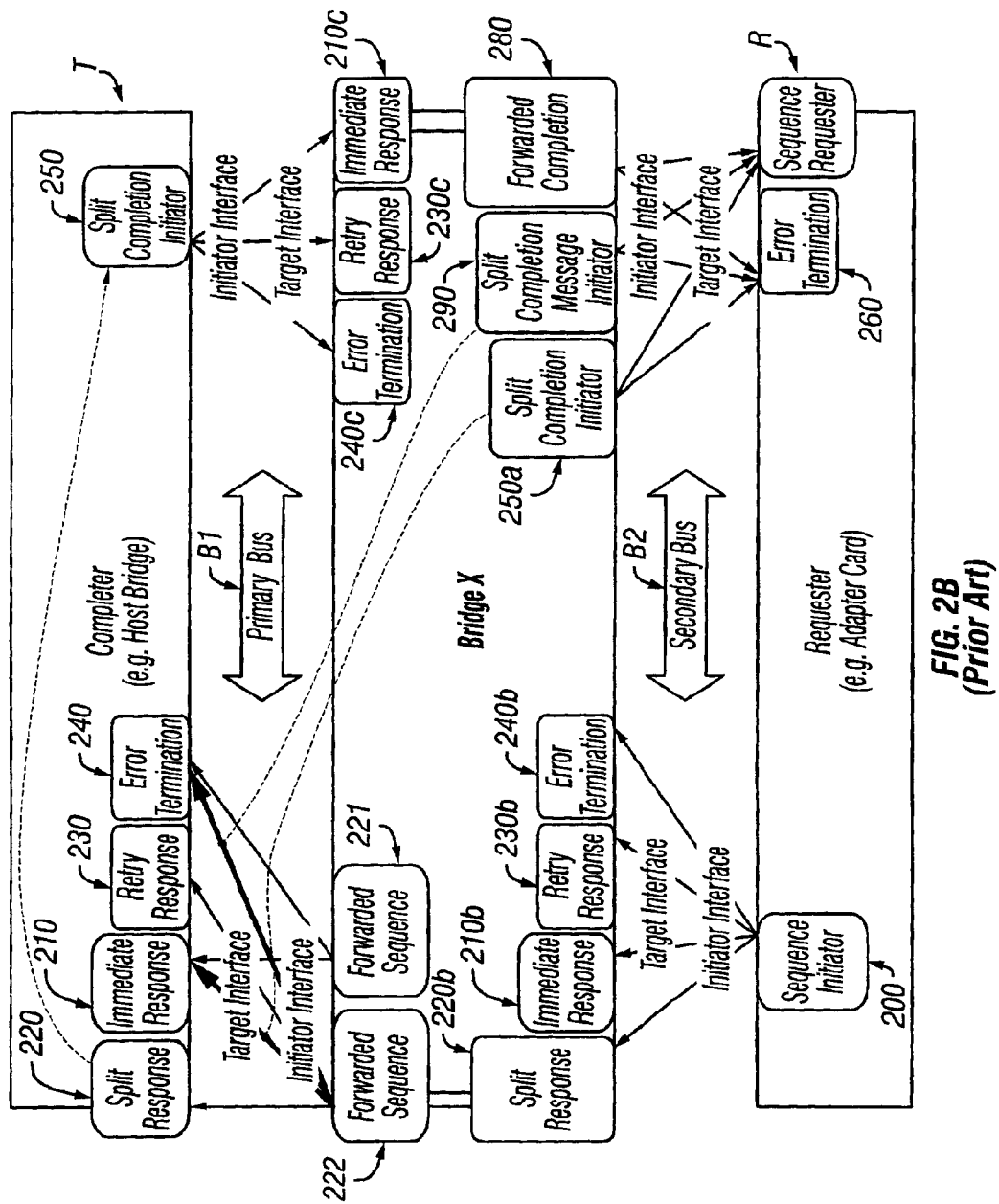
FIG. 2b is a block diagram illustrating a conventional PCI-X transaction sequence across a bridge.

In FIG. 2b, a similar overview of a conventional PCI-X transaction is shown, where the transaction crosses a PCI-X bridge X. Identically numbered elements in the requester R and the completer T are identical to those shown in FIG. 2a. However, a PCI-X bridge X is now shown to forward transactions and responses between secondary bus B2 and primary bus B1.

As in FIG. 2a, the bridge X can respond to a transaction request with an immediate response 210b, a retry response 230b, arid an error response 240b. Likewise a Split Response 220b can be returned. However, in a bridge situation as shown in FIG. 2b, the bridge X forwards the transaction request as a forwarded sequence 221 or 222 depending on whether the forwarded transaction was responded to by the bridge X with an immediate response or a Split Response.

When the target T sends a Split Completion transaction 250, the bridge X must also forward that transaction back to the initiator R. As with any transaction, the bridge X can provide an error termination 240c or a retry response 230c, as well as an immediate response 210c to the target T. If the bridge X sends an immediate response 210c, then the forwarded completion data 280 are sent to the requester R. The Split Completion exception 290 and the Split Completion transaction request 250a are sent to the requester R if the transaction forwarded to the target T is terminated with immediate response 210, retry response 230, or error termination 240.

Figure 3:
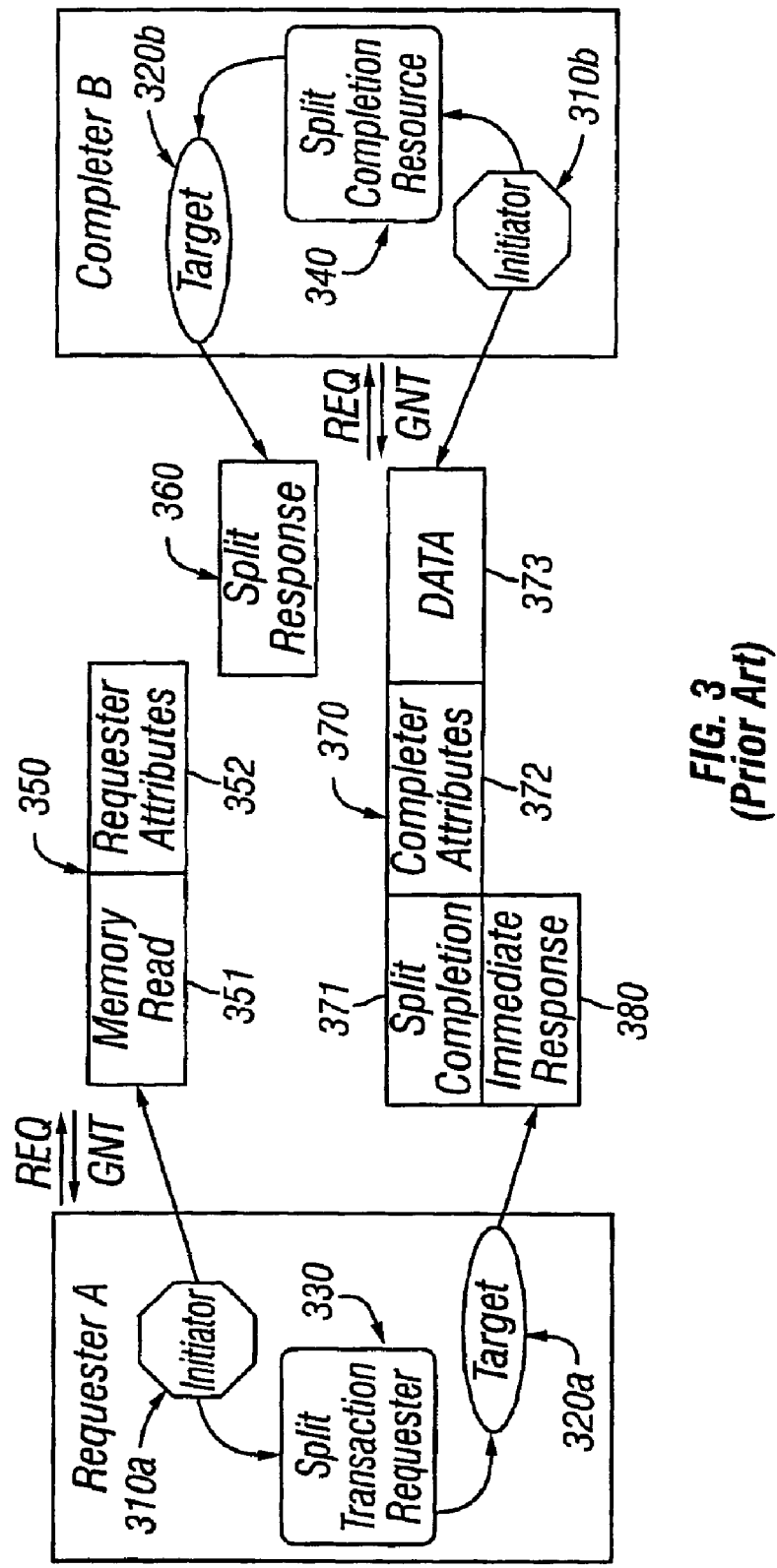
FIG. 3 is a block diagram illustrating data elements of a conventional PCI-X split transaction.

Turning to FIG. 3, an overview of the data flow of a conventional successful split transaction, in this example, a memory read transaction, is shown. For clarity of the drawing, no intermediate bridge or PCI-X bus is shown. A split transaction begins with a transaction request, such as a memory read, from a requester and ends with a response from a target, which may indicate a retry. However, a split transaction is not completed by the response, but is completed by a later Split Completion transaction initiated by the target back to the requester. In FIG. 3, a requester A sends a memory read transaction request 350 to a completer B via the initiator interface 310a of requester A. The memory read transaction request 350 contains a memory read command 351 and requester attributes data 352. Completer B receives the transaction request 350 via a target interface 320b, allocates a Split Completion resource 340, and sends a Split Response 360 back to requester A. The Split Completion resource 340 provides buffers and other needed target resources for handling split transactions. The Split Response 360 is passed to the requester A, which notifies a split transaction requester block 330 that the transaction has become a split transaction. The Split Completion resource 340, when the transaction is complete, prepares a Split Completion transaction request 370 to send the data read by the memory read transaction back to the requester A, via an initiator interface 310b of the completer B. The requester's attributes 352 are used to indicate the target addressed by the Split Completion request, which is requester A. The Split Completion transaction request 370 also contains a Split Completion command 371, a completer's attributes 372, and any associated data 373. Requester A accepts the Split Completion transaction request 370 via a target interface 320a, sends an immediate response 380 back to the completer B, then passes the Split Completion transaction request 370 to the split transaction requester block 330 to complete the memory read transaction. Although a memory read transaction is illustrated in FIG. 3, other transaction types can be handled as split transactions.

Turning to FIG. 4, a block diagram illustrates conventional details of a Split Completion address (FIG. 4a), a completer attribute block (FIG. 4b), and a Split Completion message format (FIG. 4c). The Split Completion address is driven on a set of AD (address) lines of a PCI-X bus, sometimes referred to as an AD bus, AD[31:0], or AD[63:0], during the address phase of a Split Completion transaction. A Split Completion command 400 is driven on a set of command/byte enable lines (C/BE [3:0]#) of the PCI-X bus, sometimes referred to as a C/BE bus. Fields marked "R" are reserved in the PCI-X protocol. The remaining fields 415–445 are copied from the requester attributes 350 of FIG. 3. Field 415 can be used to allow relaxed ordering of bridged transactions as defined in the PCI-X protocol and is not discussed further.

Field 420 is used by an initiator to identify sequences of transactions. Field 430 and 435 identify a device and function number of the requester and together with a bus number field 425 can be used to identify the requester to which this Split Completion is responding. Field 445 can hold the least significant seven bits of the address of the Split Request to which this is a Split Completion, or may be set to zero.

FIG. 4b identifies attributes of a target device sending the Split Completion transaction, and is sent during an attribute phase over the PCI-X bus to the initiator. Upper and lower byte count fields 450 and 490 indicate a number of bytes to be transferred with this transaction. Similar to FIG. 4a, fields 475–485 identify the target device.

FIG. 4c illustrates fields of a Split Completion message. Field 491 is a message class identifier. Split Completion messages, identified by using field 460–465 of FIG. 4b, notify a requester when a split write request has completed or an error condition prevents successful completion of a split transaction. Field 492 is a message index to identify a type of message within the message class identified in field 491. Fields 494–496 are address and remaining byte count fields describing burst memory read data not previously sent and are used to manage buffer space by the requester.

Figure 5:
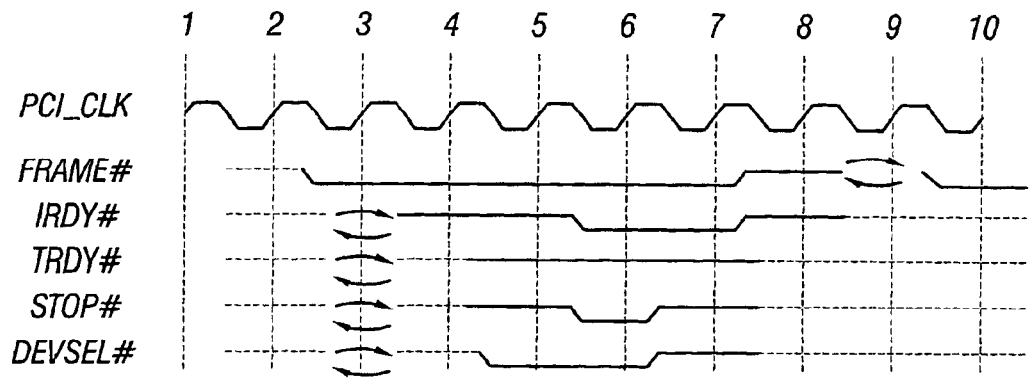
FIG. 5 is a timing diagram of a conventional PCI-X retry termination.

Turning to FIG. 5, a timing diagram illustrates a typical PCI-X retry termination. A target device signals retry by asserting DEVSEL# and STOP#, while keeping TRDY# deasserted on the first data phase. By convention, a signal name ending in # indicates the signal is asserted at a low signal level and deasserted at a high signal level. As shown in FIG. 5, FRAME# is asserted on the rising edge of PCI_CLK cycle 3. Because the target device asserts DEVSEL# on cycle 5 and STOP# on cycle 6, while keeping TRDY# deasserted, the initiator receives a retry. Conventionally, a target device will signal a retry termination when none of the Split Response resources are available. In a disclosed embodiment, illustrated below in FIGS. 7 and 8, a target device signals retry termination of split transaction requests when no Split Response resources are available and when only one Split Response resource is available, but the initiator is not a priority requester.

Figure 6A:
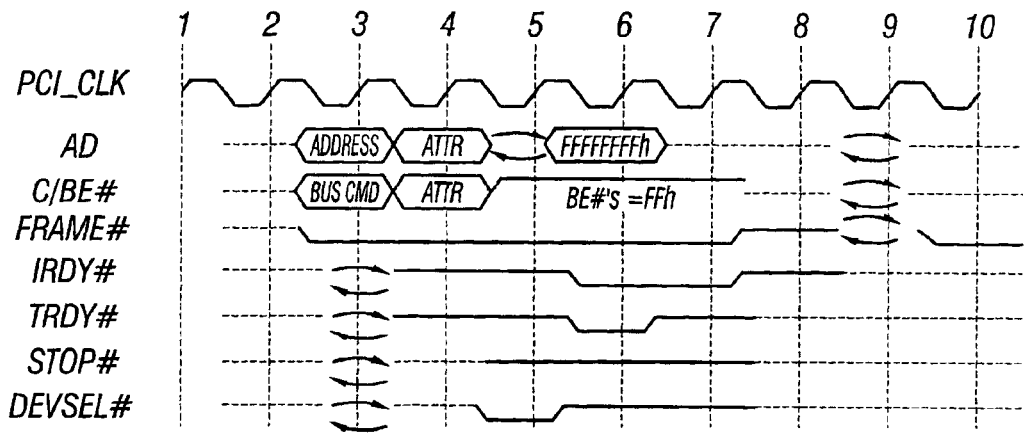
FIG. 6a is a timing diagram of a conventional PCI-X Split Response termination of a read transaction.
Figure 6B:
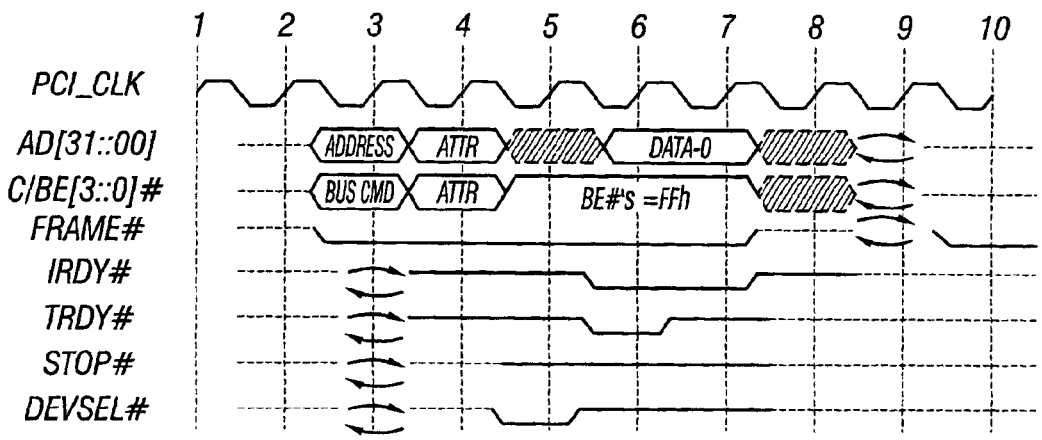
FIG. 6b is a timing diagram of a conventional PCI-X Split Response termination of a DWORD write transaction.

Turning to FIGS. 6a and 6b, two timing diagrams of a Split Response termination are shown. FIG. 6a illustrates a typical Split Response termination for a read transaction.

Setting up to clock cycle 3, the starting byte address of the transaction is driven on the AD bus together with a bus command on the C/BE# lines. The FRAME# signal is also asserted at that time. During the attribute phase setting up to PCI_CLK cycle 4, attribute data is driven on the AD and C/BE# lines. The target device signals that it has queued the transaction as a Split Request by signaling Split Response. The target first signals acceptance of the transaction by asserting DEVSEL# on cycle 5 then signals Split Response by asserting TRDY#, deasserting DEVSEL#, and keeping STOP# deasserted on the first data phase of the transaction on PCI_CLK clock cycle 6. Further, the target drives all bits of the AD lines high during that PCI_CLK clock cycle. The transaction is then finished by the target device deasserting TRDY# on clock 7 followed by the initiator device deasserting IRDY# and FRAME# on clock 8.

Similarly, FIG. 6b illustrates a timing diagram for a typical DWORD write transaction terminated with a Split Response. As in FIG. 6a, the target signals that it has enqueued this transaction as a Split Request by signaling Split Response, asserting TRDY#, deasserting DEVSEL#, and keeping STOP# deasserted on the first data phase of the transaction, on clock cycle 7. Other split transactions are possible.

Figure 7:
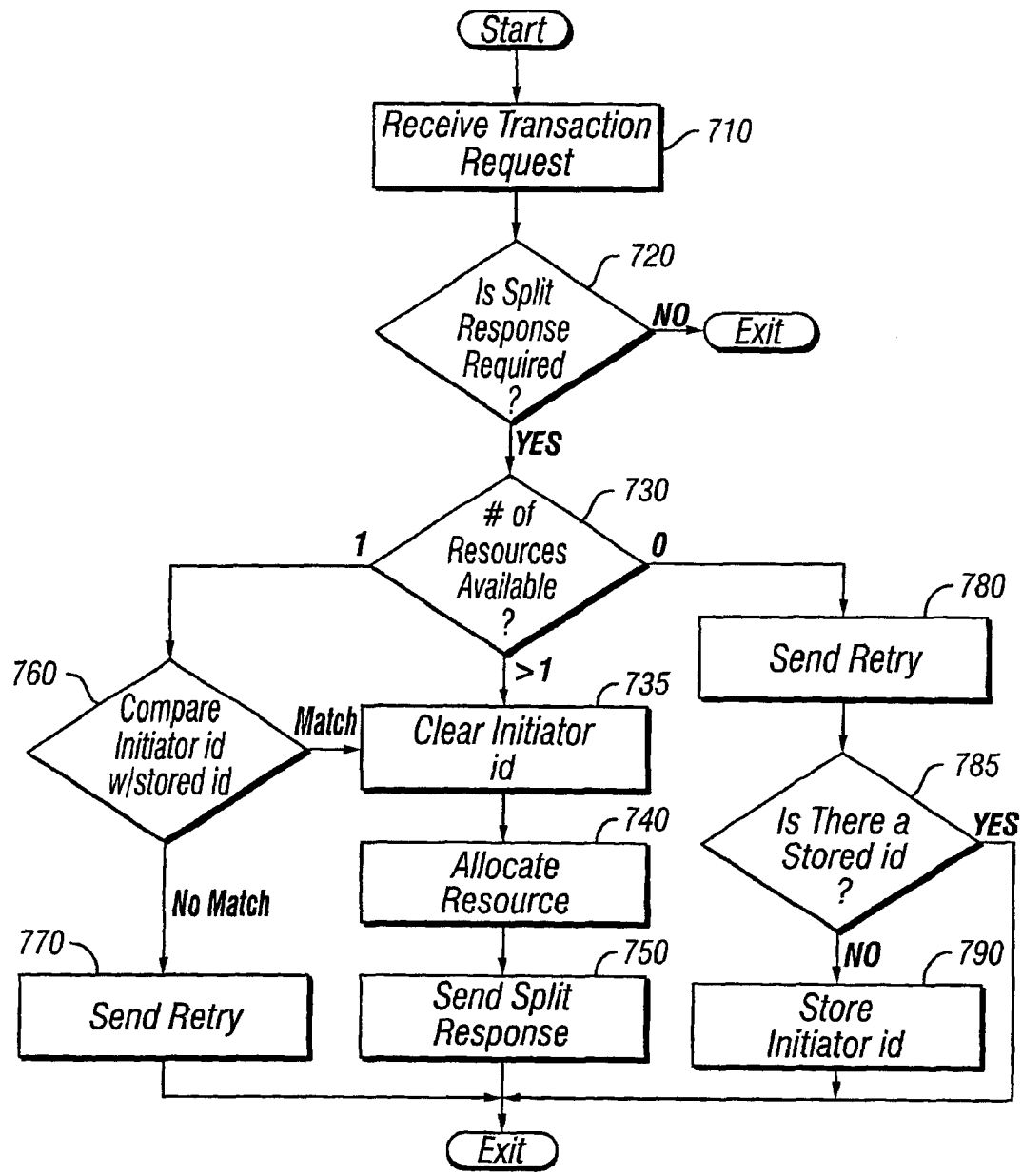
FIG. 7 is a flowchart of a non-bus arbiter device resource allocation embodiment.

Turning to FIG. 7, a flow chart of a disclosed embodiment for allocating Split Response resources on a target device is shown. The PCI-X protocol allows for a target device to handle one Split Response transaction at a time. However, to improve bus usage and system efficiency, target devices are also allowed to handle multiple Split Response transactions simultaneously. If a target device does not have sufficient resources to handle a split transaction, the target device may issue a retry termination to a Split Response transaction. In a disclosed embodiment, a technique for allocating target device Split Completion resources can minimize starvation of initiator devices that can occur when a single initiator is consistently allocated scarce Split Completion resources as can occur in a conventional PCI-X system. As shown in FIG. 7, in step 710, the target device receives a transaction request. In step 720, the target device determines whether or not a Split Response termination of the transaction is required. If the target device can complete the transaction immediately, it is not required to issue a Split Response. However, if the target device would take more than a limited number of clocks to complete the transaction, or if the target device can complete the transaction immediately, but desires to perform a Split Transaction for any reason, the completer is required to issue a Split Response. If the transaction completes immediately or encounters an error, no Split Response is required. If a Split Response is required, the process proceeds to step 730.

In step 730, resource allocator logic of the target device determines the number of resources currently available. If no resources are available, then in step 780, the target device sends a retry response to the initiator device. In step 785, the resource allocator then determines whether the initiator is the first initiator that received a retry after all resources were allocated, by determining if a stored initiator identification exists. If it does, then the resource allocator exits. If no stored initiator identification exists, then in step 790, initiator identification information is stored, identifying the initiator as a priority requester. As shown in FIG. 4a, this initiator identification information includes the requester bus number 425 and the requester device number 430. In a disclosed embodiment, the initiator identification information further includes the requester function number 435, which can identify which function of a multifunction initiator device initiated the transaction. These fields provide sufficient information to identify the initiator of the transaction. Following step 790, the resource allocator exits.

If more than one Split Response resources is available, the resource allocator clears this initiator identification in step 735, if it was previously stored in step 790, allocates a resource from the available resources in step 740, then sends a Split Response termination in step 750. Upon receiving the Split Response, the initiator can proceed with other transactions, until the requester is able to begin the Split Completion transaction after completing the requested transaction.

When only one resource is available, then the resource allocator decides whether to send a retry response or a Split Response termination, as explained below. Only if the current initiator is the priority requester, identified in step 790 as explained above, will the resource be allocated to the current initiator. Thus, only the first initiator to receive a retry response after all resources are allocated will be allocated the last available resource. In step 760, the initiator identification of the current initiator is compared with the stored initiator identification. If the current initiator identification information matches the stored initiator identification, i.e., the current initiator is the priority requester device, then the resource allocator will clear the stored initiator identification in step 735, allocate the resource in step 740, send a Split Response in step 750, then exit. If the current initiator identification does not match the stored initiator identification, i.e., the current initiator is not the priority requester, then in step 770, the resource allocator will send a retry response to the current initiator, then exit. If no stored initiator information exists, then step 760 will indicate a match and proceed to steps 735–750 before exiting.

FIG. 7 is an embodiment for a target device that does not contain a bus arbiter. In this embodiment, the resource allocator only remembers the first device to be responded to with retry and relies on the randomness of the bus and the arbiter sequence to share the resources if more than two devices are competing for them. In one embodiment, the initiator identification information is stored in step 790 in a register of the target device resource allocator. Other techniques for identifying the first initiator or priority requester can be used. Other embodiments for a target device that does not contain a bus arbiter store multiple priority requesters at the same time, then service them one at a time, as resources become available. In one such embodiment the initiator information is stored in step 790 in a first-in-first-out register file.

In a second embodiment, one for devices that include a bus arbiter, a round-robin technique is used to provide fairer allocation of resources when multiple initiators are terminated with retry while Split Completion resources are not available.

Figure 8:
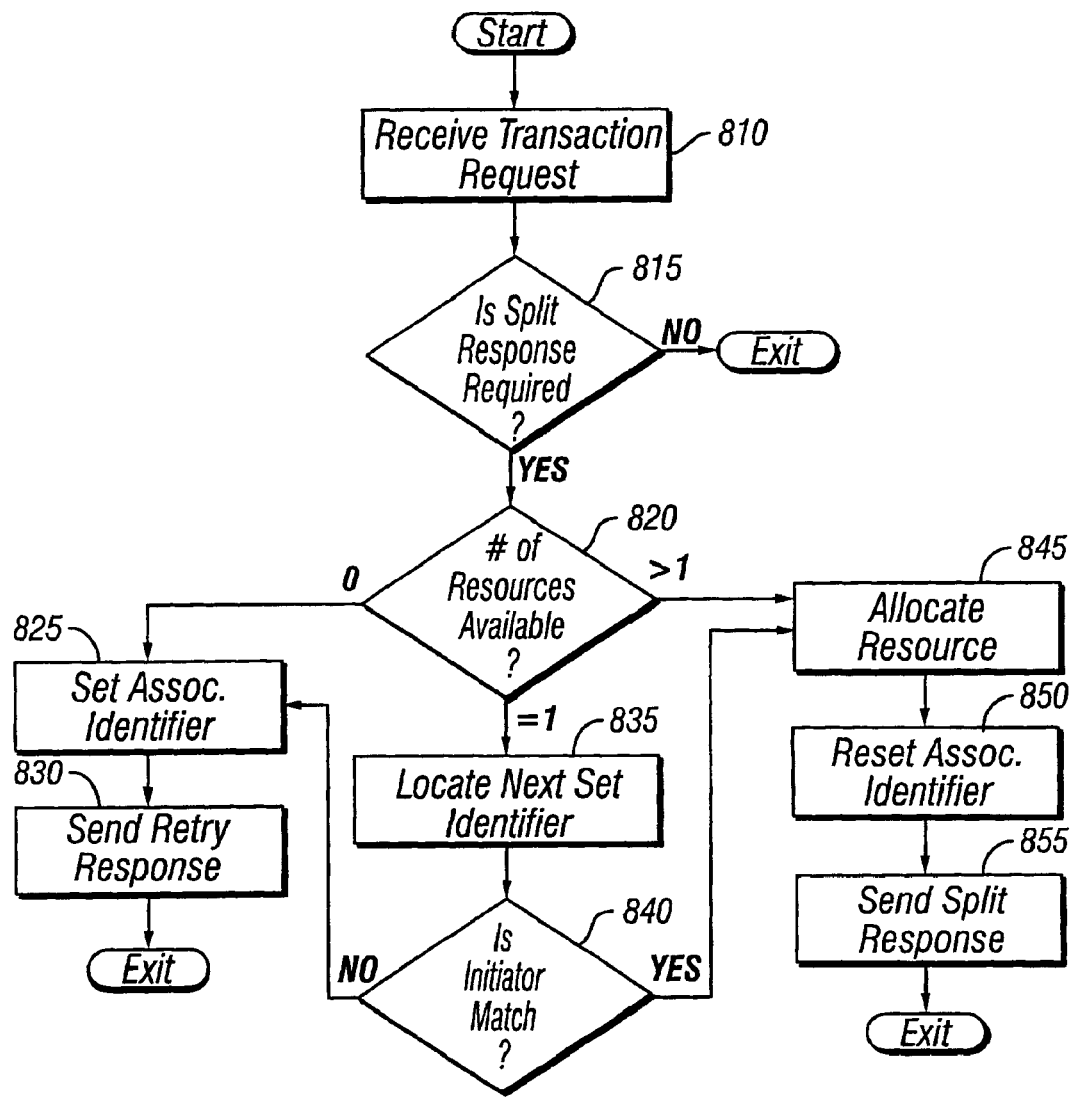
FIG. 8 is a flowchart of a bus-arbiter device resource allocation embodiment.

Turning to FIG. 8, a flow chart of the resource allocator according to the second embodiment is shown. Like steps 710 and 720 of FIG. 7, steps 810 and 815 receive the transaction request and determine whether or not a Split Response is required. If no Split Response is required, then the resource allocation is complete. If a Split Response is required, then the resource allocator determines the number of resources available in step 820. If more than one resource is available, then in step 845, an available resource of the plurality of resources is allocated to the current initiator device. In contrast with the non-bus arbiter embodiment of FIG. 7, a bus arbiter embodiment maintains a plurality of identifiers associated with each initiator device. In one embodiment, each identifier is associated with an initiator device by associating an identifier with the GNT# signal for that initiator device. Other techniques for associating an identifier with an initiator can be used.

After allocating the resource in step 845, the resource allocator then resets the identifier associated with the current initiator in step 850. Finally, in step 855, the target device sends a Split Response termination to the initiator.

If no resources are available, then in step 825, the resource allocator sets the associated identifier for the current initiator, indicating the current initiator is a priority requester device. Then in step 830, the resource allocator sends a retry response to the initiator.

If only one resource is available, in step 835, the resource allocator determines the next set identifier, using a round-robin technique. In one embodiment, each of the identifiers is a single-bit flag arranged in a fixed order in a loop with a pointer that traverses the loop in one direction. Determining the next set identifier is performed by advancing the pointer around the loop to the next flag that is set. The initiator associated with that flag is then identified as the priority requester. Other round-robin selection techniques can be used. Additionally, selection of the priority requester can use bases other than round robin for selecting a priority requester.

Once the priority requester has been determined in step 835, in step 840, the current initiator is compared to the initiator identified in step 835 as the priority requester device. If the current initiator matches the priority requester device, then the target allocates the resource in step 845, resets the associated identifier in step 830, and sends the Split Response termination in step 855 to the initiator. If the initiator does not match the priority requester identifier, then the identifier associated with the current initiator is set in step 825 and a retry response is sent in step 850 to the initiator.

Figure 9A:
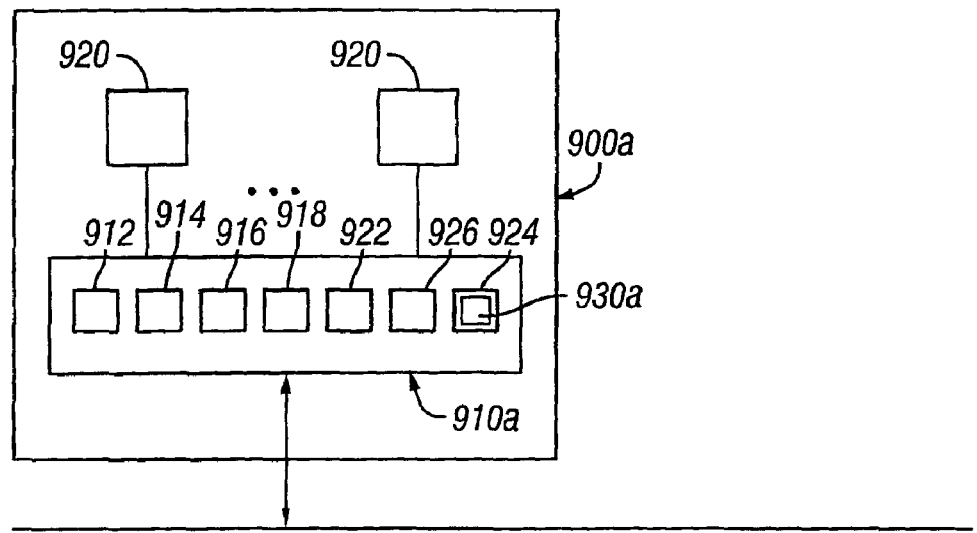
FIG. 9a is a block diagram of a non-bus arbiter target device embodiment.
Figure 9B:
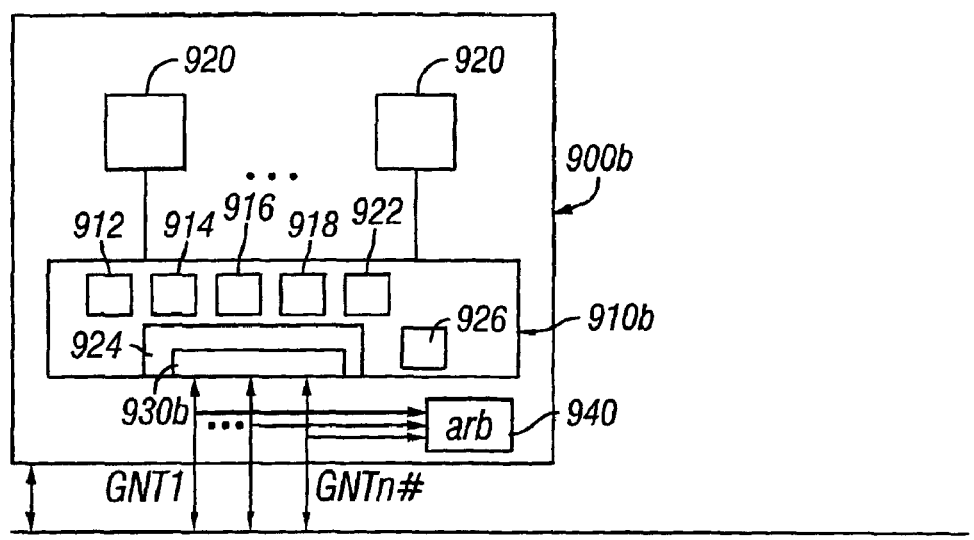
FIG. 9b is a block diagram of a bus arbiter target device embodiment.

Turning now to FIGS. 9a and 9b, block diagrams illustrating the resource allocator of a target device as described in FIGS. 7 and 8 are shown. FIG. 9a illustrates a target device that is not a bus arbiter. Target device 900a contains a resource allocator block 910a, to which are attached resources 920. Any number of resources can be defined in the target device 900a. Storage location 930a is provided in the resource allocator 910a for storing the identifier information of the first initiator device to which the resource allocator responded to a Split Response transaction with a retry request, as described in FIG. 7. In one embodiment, storage location 930a is a register of the target device.

Circuitry 912 monitors availability of the resources 920. Circuitry 914 is a requestor interface to receive transactions from initiator devices. Circuitry 916 sends retry responses to initiators if no resources 920 are available. Circuitry 918 allocates a resource 920 to a transaction if more than one resource 920 is available. Circuitry 922 allocates a resource 920 to a priority requester if only one resource 920 is available. Circuitry 924 determines whether an initiator is a priority requester. Circuitry 926 sends a retry response to a non-priority requester initiator if only one resource 920 is available and circuitry 924 indicates the current requester is not the priority requester. One skilled in the art will recognize that resource allocator 910a can be implemented using a hardware definition language such as Verilog and that circuitries 912–926 can be implemented as separate circuitries or in one or more combined circuitries. Resource allocator 910a can also be implemented as software or firmware in the target device 900a.

FIG. 9b is a block diagram illustrating a target device 900b, which contains a bus arbiter 940. As in FIG. 9a, resources 920 are coupled to the resource allocator 910b. However, instead of the storage location 930a as in the embodiment of FIG. 9a, in a disclosed embodiment, a plurality of identifiers 930b is connected to the GNT1#-GNTn# signals, associating each of the identifiers of the plurality of identifiers 930b with a corresponding GNT# signal, thus associating each of the identifiers 930b with an initiator device. Other techniques for associating an identifier with an initiator can be used. One skilled in the art will recognize that resource allocator 910b can be implemented using a hardware definition language such as Verilog and that circuitries 912–926 can be implemented as separate circuitries or in one or more combined circuitries. Resource allocator 910b can also be implemented as software or firmware in the target device 900b.

Figure 10:
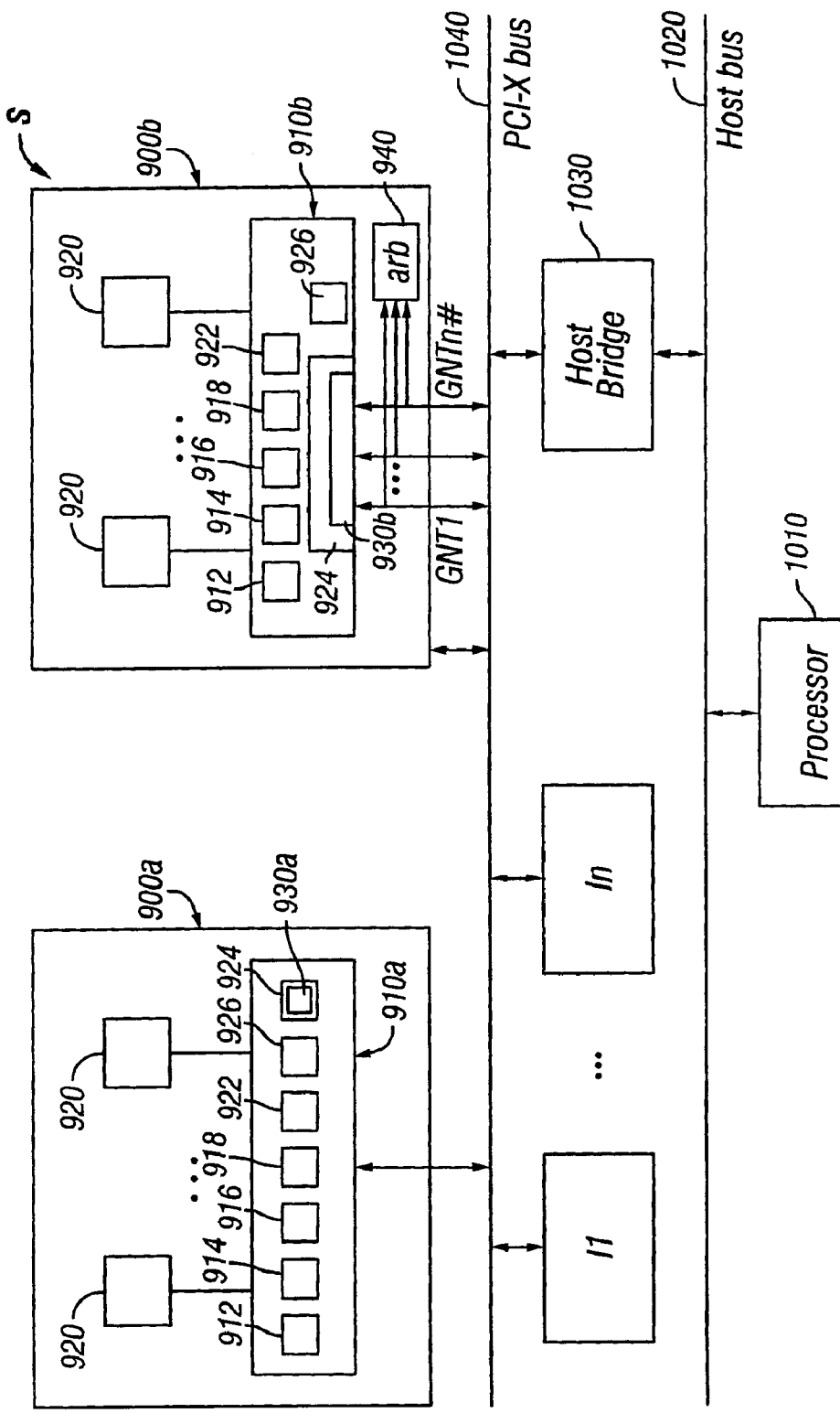
FIG. 10 is a block diagram of a computer bus-connected system incorporating target devices as illustrated in FIGS. 9a–9b.

FIG. 10 is a block diagram of a computer system S incorporating target devices as illustrated in FIGS. 9a–9b. A processor 1010 is connected via a host bus 1020 to a PCI-X host bridge 1030. Host bridge 1030 bridges the host bus 1020 and the PCI-X bus 1040. Initiators I1-In are also connected to the PCI-X bus 1040, sending transactions to target devices 900a and 900b. One skilled in the art will recognize that a device may be an initiator for a first transaction and a target for a second transaction.

The foregoing disclosure and description has been given in the context of a PCI-X bus. Other busses and bus protocols that provide for splitting a transaction for later completion by a target device can be used.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A method for allocating resources in a computer system, the method comprising the steps of:
   (a) receiving a request for a transaction on a target device coupled to a computer bus, the target device having a plurality of resources, from an initiator device of a plurality of initiator devices coupled to the computer bus;
   (b) if no resource of the plurality of resources is available, identifying the initiator device as a priority requester device by determining whether stored identification information of the initiator device exists, and if the stored identification information exists, sending a retry response to the initiator device to retry the request, and if no stored identification information exists, storing identification information of the initiator device, creating the stored identification information;

(c) if only one resource of the plurality of resources is available, comparing the stored identification information with identification information of the initiator device and if the stored identification information matches the identification information of the initiator device, allocating the resource and deleting the stored identification information; and (d) if only one resource of the plurality of resources is available comparing the stored identification information with identification information of the initiator device and sending the response to the initiator device to retry the request if the stored identification information differs from the identification information of the initiator device (e) if more than one resource of the plurality of resources is available, allocating an available resource of the plurality of resources to the initiator device and deleting any stored identification information.

2. The method of claim 1, the step of storing identification information of the initiator device comprising the step of:

providing a register in the target device; and storing identification information in the register.

3. A method for allocating resources in a computer system comprising the steps of:

(a) receiving a request for a transaction on a target device coupled to a computer bus, the target device having a plurality of resources from an initiator device of a plurality of initiator devices coupled to the computer bus;

(b) if more than one resource of the plurality of resources is available, allocating an available resource of the plurality of resources to the initiator device;

(c) if no resource of the plurality of resources is available, selecting a first identifier of the plurality of identifiers which is set; and identifying the initiator device associated with the first identifier as the priority requester device;

(d) if only one resource of the plurality of resources is available comparing the stored identification information with identification information of the initiator device; and (e) if only one resource of the plurality of resources is available comparing the stored identification information with identification information of the initiator device; and sending the response to the initiator device to retry the request if the stored identification information differs from the identification information of the initiator device (f) providing a plurality of identifiers in the target device, each of the plurality of identifiers associated with one of the plurality of initiator devices;

(g) if the initiator device owns the bus, setting the identifier of the plurality of identifiers associated with the initiator device if the request is responded to with the retry response and resetting the identifier of the plurality of identifiers associated with the initiator device if the request is responded to with a non-retry response.

4. The method of claim 3, the step of selecting a first identifier comprising the step of:

selecting the first identifier on a round-robin basis.

5. The method of claim 3, the target device comprising:

a bus arbiter, wherein the plurality of identifiers are associated with the plurality of initiator devices by associating each of the plurality of identifiers with a grant(GNT#) signal.

6. The method of claim 1, wherein the computer bus is a PCI-X bus and the plurality of resources is a plurality of split completion resources.

7. The method of claim 6, wherein the transaction is a byte-count memory-read transaction.

8. The method of claim 6, wherein allocating a resource comprises the step of:

sending a split response message to the initiator device.

9. A computer system, comprising:

a processor;

a computer bus coupled to the processor;

a plurality of initiator devices coupled to the computer bus; and a target device coupled to the computer bus, the target device comprising:

a plurality of resources;

a storage location;

circuitry adapted to identify the initiator device as a priority requester device if no resource of the plurality of resources is available and further adapted to store identification information of the initiator device in the storage location, creating a stored identification information, if no stored identification information exists in the storage location;

circuitry adapted to indicate which of the plurality of resources is available;

circuitry adapted to receive a transaction from an initiator device of the plurality of initiator devices;

circuitry adapted to allocate an available resource of the plurality of resources to the initiator device if more than one resource of the plurality of resources is available and to delete stored identification information;

circuitry adapted to send a retry response to the initiator device to retry the request if no resource of the plurality of resources is available;

circuitry adapted to allocate an available resource of the plurality of resources to the initiator device if only one resource of the plurality of resources is available and the initiator device is the priority requester device and further adapted to compare the stored identification information with identification information of the initiator device, delete the stored identification information and to allocate an available resource of the plurality of resources to the initiator device if the stored identification information matches the identification information of the initiator device; and circuitry adapted to send a response to the initiator device to retry the request if only one resource of the plurality of resources is available and the initiator device is not the priority requester device and adapted to compare the stored identification information with identification information of the initiator device and circuitry to send a response to the initiator device to retry the request if the stored identification information differs from the identification information of the initiator device.

10. The computer system of claim 9, the storage location comprising:
a register.

11. A computer system comprising,
a processor;
a computer bus coupled to the processor;
a plurality of initiator devices coupled to the computer bus; and
a target device coupled to the computer bus, the target device comprising:
a plurality of resources;
circuitry adapted to indicate which of the plurality of resources is available;
circuit adapted to receive a transaction from an initiator device of the plurality of initiator devices;
a plurality of identifiers, each of the plurality of identifiers associated with one of the plurality of initiator devices;
circuitry to set the identifier of the plurality of identifiers associated with the initiator device if the initiator device owns the bus and the request was responded to with a retry response;
circuitry to reset the identifier of the plurality of identifiers associated with the initiator device if the initiator device owns the bus and the request was responded to with a non-retry response;
circuitry adapted to allocate an available resource of the plurality of resources to the initiator device if more than one resource of the plurality of resources is available;
circuitry adapted to identify the initiator device as a priority requester device if no resource of the plurality of resources is available and comprising circuitry adapted to select a first identifier of the plurality of identifiers which is set and circuitry adapted to identify the initiator device associated with the first identifier as the priority requester device;
circuitry adapted to send a retry response to the initiator device to retry the request if no resource of the plurality of resources is available;
circuitry adapted to allocate an available resource of the plurality of resources to the initiator device if only one resource of the plurality of resources is available and the initiator device is the priority requester device; and
circuitry adapted to send a response to the initiator device to retry the request if only one resource of the plurality of resources is available and the initiator device is not the priority requester device.

12. The computer system of claim 11, the circuitry adapted to select a first identifier of the plurality of identifiers comprising:
circuitry to select the first identifier on an round-robin basis.

13. The computer system of claim 11, the target device further comprising:
a bus arbiter,
wherein the plurality of identifiers are associated with the plurality of initiator devices by associating each of the plurality of identifiers with a grant(GNT#) signal.

14. The computer system of claim 9,
wherein the computer bus is a PCI-X bus, and
wherein the plurality of resources is a plurality of split completion resources.

15. The computer system of claim 14, wherein the transaction is a byte-count memory-read transaction.

16. A resource allocator for a target device coupled to a computer bus, the target device adapted to receive a transaction request from a plurality of initiator devices coupled to the computer bus, the resource allocator comprising:
a plurality of resources;
a storage location;
circuitry adapted to indicate which of the plurality of resources is available;
circuitry adapted to identify the initiator device as a priority requester device if no resource of the plurality of resources is available and adapted to store identification information of the initiator device in the storage location, creating a stored identification information, if no stored identification information exists in the storage location;
circuitry adapted to send a retry response to the initiator device to retry the request if no resource of the plurality of resources is available;
circuitry adapted to allocate an available resource of the plurality of resources to the initiator device if more than one resource of the plurality of resources is available and adapted to delete stored identification information;
circuitry adapted to allocate an available resource of the plurality of resources to the initiator device if only one resource of the plurality of resources is available and the initiator device is the priority requester device and adapted to compare the stored identification information with identification information of the initiator device and to delete the stored identification information and to allocate an available resource of the laurel of resources if the stored identification information matches the identification information of the initiator device; and
circuitry adapted to send a response to the initiator device to retry the request if only one resource of the plurality of resources is available and the initiator device is not the priority requester device and adapted to compare the stored identification information with identification information of the initiator device and to send a response to the initiator device to retry the request if the stored identification information differs from the identification information of the initiator device.

17. The resource allocator of claim 16, the storage location comprising:
a register.

18. A resource allocator for a target device coupled to a computer bus, the target device adapted to receive a transaction request from a plurality of initiator devices coupled to the computer bus, the resource allocator comprising:
a plurality of identifiers, each of the plurality of identifiers associated with one of the plurality of initiator devices;
circuitry to set the identifier of the plurality of identifiers associated with the initiator device if the initiator device owns the bus and the request was responded to with a retry response;
circuitry to reset the identifier of the plurality of identifiers associated with the initiator device if the initiator device owns the bus and the request was responded to with a non-retry response; and
a plurality of resources;
circuitry adapted to indicate which of the plurality of resources is available;
circuitry adapted to identify the initiator device as a priority requester device if no resource of the plurality of resources is available the first circuitry comprising circuitry adapted to select a first identifier of the plurality of identifiers which is set and circuitry adapted to identify the initiator device associated with the first identifier as the priority requester device;

circuitry adapted to send a retry response to the initiator device to retry the request if no resource of the plurality of resources is available;

circuitry adapted to allocate an available resource of the plurality of resources to the initiator device if more than one resource of the plurality of resources is available;

circuitry adapted to allocate an available resource of the plurality of resources to the initiator device if only one resource of the plurality of resources is available and the initiator device is the priority requester device; and circuitry adapted to send a response to the initiator device to retry the request if only one resource of the plurality of resources is available and the initiator device is not the priority requester device.

19. The resource allocator of claim 18, the circuitry adapted to select a first identifier of the plurality of identifiers comprising:
circuitry to select the first identifier on an round-robin basis.

20. The resource allocator of claim 18, further comprising:
a bus arbiter,
wherein the plurality of identifiers are associated with the plurality of initiator devices by associating each of the plurality of identifiers with a grant signal.

21. The resource allocator of claim 16,
wherein the plurality of resources is a plurality of split completion resources adapted to handle a PCI-X computer bus split transaction.

22. The resource allocator of claim 21, wherein the PCI-X computer bus split transaction is a byte-count memory-read transaction.

23. A resource allocator for a target device coupled to a computer bus, the target device adapted to receive transaction requests from a plurality of initiator devices coupled to the computer bus, the resource allocator comprising:
a plurality of resource means for responding to a transaction request;
means for indicating availability of the plurality of resource means;
means for identifying an initiator device of the plurality of initiator devices as a priority requester device if none of the plurality of resource means is available, means for identifying comprising means for creating a priority requester device identification information from identification information of the initiator if no priority requester device identification information exists and means for comparing the primary requester device identification information with identification information of the initiator device;
first retry means for sending a retry response to the initiator device if none of the plurality of resource means is available;
first allocation means for allocating one of the plurality of resource means to the initiator device if the means for indicating availability indicates more than one of the plurality of resource means is available, first allocation means comprising means for deleting the primary requester device identification information;
second allocation means for allocating an available resource means of the plurality of resource means to the primary requester device of the means for indicating availability indicates only one of the plurality of resource means is available, second allocation means comprising means for allocating the available resource and deleting the primary requester device identification information if the means for comparing produces a match; and
second retry means for sending a retry response to an indicator device if the initiator device is not the primary requester device and the means for indicating availability indicates that only one of the plurality of resource means is available, second retry means comprising means for sending the retry response if the means for comparing does not produce a match.

24. A resource allocator for a target device coupled to a computer bus, the target device adapted to receive transaction requests from a plurality of initiator devices coupled to the computer bus, the resource allocator comprising:
a plurality of resource means for responding to a transaction request;
means for indicating availability of the plurality of resource means;
means for identifying an initiator device of the plurality of initiator devices as a priority requester device if none of the plurality of resource means is available;
first retry means for sending a retry response to the initiator device if none of the plurality of resource means is available;
first allocation means for allocating one of the plurality of resource means to the initiator device if the means for indicating availability indicates more than one of the plurality of resource means is available;
second allocation means for allocating an available resource means of the plurality of resource means to the primary requester device of the means for indicating availability indicates only one of the plurality of resource means is available; and
second retry means for sending a retry response to an indicator device if the initiator device is not the primary requester device and the means for indicating availability indicates that only one of the plurality of resource means is available;
means for associating an identifier with each of the plurality of initiators;
means for setting the identifier associated with the initiator device if the transaction request is responded to with a retry response;
means for unsetting the identifier associated with the initiator device if the transaction request is responded to with a non-retry response; and
the means for identifying comprising:
means for selecting a first set identifier; and
means for identifying the initiator device associated with the first set identifier as the primary requester device.

25. The resource allocator of claim 24, the means for selecting comprising:
means for selecting a next set identifier on a round-robin basis.

26. The resource allocator of claim 24, the means for associating comprising:
means for associating an identifier with a grant signal to a bus arbiter in the target device from the initiator device.

* * * * *

UNITED STATES PATENT AND TRADEMARK OFFICE
CERTIFICATE OF CORRECTION

PATENT NO.       : 6,892,259 B2
APPLICATION NO.  : 09/967608
DATED            : May 10, 2005
INVENTOR(S)      : Alan L. Goodrum et al.

Page 1 of 1

It is certified that error appears in the above-identified patent and that said Letters Patent is hereby corrected as shown below:

Claim 16, Column 14, line 31, delete "laurel" and insert therefor --plurality--

Signed and Sealed this

Twenty-third Day of June, 2009

JOHN DOLL
*Acting Director of the United States Patent and Trademark Office*